US012441313B2

(12) United States Patent
Kang

(10) Patent No.: US 12,441,313 B2
(45) Date of Patent: Oct. 14, 2025

(54) AUTONOMOUS DRIVING CONTROL APPARATUS AND METHOD THEREOF

(71) Applicants: Hyundai Motor Company, Seoul (KR); Kia Corporation, Seoul (KR)

(72) Inventor: Dong Hoon Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 17/981,947

(22) Filed: Nov. 7, 2022

(65) Prior Publication Data

US 2023/0311879 A1 Oct. 5, 2023

(30) Foreign Application Priority Data

Mar. 11, 2022 (KR) .................. 10-2022-0030978

(51) Int. Cl.
*B60W 30/165* (2020.01)
*B60W 30/18* (2012.01)
*B60W 40/04* (2006.01)
*B60W 60/00* (2020.01)

(52) U.S. Cl.
CPC .... *B60W 30/165* (2013.01); *B60W 30/18163* (2013.01); *B60W 40/04* (2013.01); *B60W 60/001* (2020.02); *B60W 2420/403* (2013.01); *B60W 2420/408* (2024.01); *B60W 2554/4042* (2020.02); *B60W 2554/4046* (2020.02); *B60W 2554/802* (2020.02)

(58) Field of Classification Search
CPC ......... B60W 30/165; B60W 30/18163; B60W 40/04; B60W 60/001; B60W 2420/403; B60W 2420/408; B60W 2554/4042; B60W 2554/4046; B60W 2554/802; B60W 30/16; B60W 10/18; B60W 10/20; B60W 60/0017; B60W 40/02; B60W 2554/4041; G01S 13/931; G01S 17/931
See application file for complete search history.

(56) References Cited

U.S. PATENT DOCUMENTS

2021/0197858 A1 * 7/2021 Zhang .................... G08G 1/161

* cited by examiner

*Primary Examiner* — Yuen Wong
(74) *Attorney, Agent, or Firm* — Banner & Witcoff, Ltd.

(57) ABSTRACT

A longitudinal autonomous driving control apparatus for following a target vehicle and a method thereof are provided. A sensor device provided in a vehicle obtains information about one or more surrounding vehicles. A controller analyzes longitudinal behaviors of the one or more surrounding vehicles and determines whether the one or more surrounding vehicles are vehicles suitable for longitudinal following autonomous driving control of the vehicle. The autonomous driving control apparatus actively select a target vehicle optimized for longitudinal autonomous driving control performance to improve completeness of an autonomous driving function.

17 Claims, 7 Drawing Sheets

---- PRECEDING VEHICLE ON EGO-LANE
........ PRECEDING VEHICLE ON ADJACENT LANE
—·— PRECEDING VEHICLE TRAVELING ON LANE CONDUCIVE TO MAKING LANE CHANGE WHILE DRIVING

| AUTOMATION LEVEL | SAE CLASSIFICATION CRITERIA | SYSTEM ROLE | DRIVER ROLE |
|---|---|---|---|
| LEVEL 0 | NO AUTOMATION | PERFORM TEMPORARY EMERGENCY INTERVENTION OR PROVIDE WARNING ONLY | DRIVER PERFORMS ALL DRIVING |
| LEVEL 1 | DRIVER ASSISTANCE | PERFORM SOME TRAVEL FUNCTIONS SUCH AS STEERING, ACCELERATION/DECELERATION, AND LIKE TOGETHER UNDER BOARDING OF DRIVER WHO PERFORMS TRAVEL FUNCTION IN NORMAL OPERATION SECTION | DRIVER DETERMINES WHETHER/WHEN TO OPERATE LEVEL 1 SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/LEVEL 1 SYSTEM MONITORING AND IMMEDIATE EMERGENCY PREPARATION) |
| LEVEL 2 | PARTIAL AUTOMATION | PERFORM TRAVEL FUNCTION SUCH AS STEERING, ACCELERATION/DECELERATION, AND LIKE INSTEAD OF DRIVER WHO IS MONITORING STEERING AND ACCELERATION/DECELERATION DEVICES UNDER BOARDING OF DRIVER | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL (INCLUDING TRAVEL ENVIRONMENT/VEHICLE DRIVING/LEVEL 2 SYSTEM MONITORING AND IMMEDIATE EMERGENCY PREPARATION) |
| LEVEL 3 | CONDITIONAL AUTOMATION | TRANSFER RIGHT TO CONTROL TRAVEL TO DRIVER IN SITUATION OUTSIDE CONDITION AND PERFORM TRAVEL FUNCTION SUCH AS STEERING, ACCELERATION/DECELERATION, AND LIKE | DRIVER DETERMINES WHETHER/WHEN TO OPERATE SYSTEM AND PERFORMS ALL DRIVING EXCEPT STEERING WHEEL OR ACCELERATION/DECELERATION PEDAL CONTROL AND TRAVEL ENVIRONMENT MONITORING (DRIVER IS ABLE TO PREPARE EMERGENCY BY NECESSARILY RECEIVING RIGHT TO CONTROL WHEN LEVEL 3 SYSTEM REQUESTS CONTROL TO RIGHT TRANSFER) |
| LEVEL 4 | HIGH AUTOMATION | SYSTEM PERFORMS ALL TRAVEL FUNCTIONS UNDER BOARDING OF DRIVER FOR EXTREMELY EXCEPTIONAL SITUATION | DRIVER MAY SELECTIVELY PREPARE EMERGENCY WHEN LEVEL 4 SYSTEM REQUESTS RIGHT TO CONTROL TRANSFER |
| LEVEL 5 | FULL AUTOMATION | PERFORM COMPLETE TRAVEL FUNCTION CAPABLE OF RESPONDING TO ALL SITUATIONS WITHOUT DRIVER | DRIVER ONLY DETERMINES WHETHER TO OPERATE SYSTEM BUT DOESN'T PERFORM ALL DRIVING |

Fig 1

AUTONOMOUS DRIVING CONTROL APPARATUS AND METHOD THEREOF

CROSS-REFERENCE TO RELATED APPLICATION

This application claims the benefit of priority to Korean Patent Application No. 10-2022-0030978, filed in the Korean Intellectual Property Office on Mar. 11, 2022, the entire contents of which are incorporated herein by reference.

TECHNICAL FIELD

The present disclosure relates to an autonomous driving control apparatus and a method thereof, and more particularly, relates to a longitudinal autonomous driving control apparatus for following a target vehicle and a method thereof.

BACKGROUND

An autonomous vehicle may need a capability of adaptively coping with its surroundings, which may change in real time while driving. A reliable determination control function may be needed for wide adoption of mass-produced autonomous vehicles. A semi-autonomous vehicle, which has been introduced on the market in recent years, can perform driving, braking, and steering on behalf of a driver to reduce fatigue of the driver. Unlike fully autonomous driving, semi-autonomous driving requires the driver to keep focusing on the driving by, for example, requiring the driver to continue to keep his or her hands on the steering wheel. Some semi-autonomous vehicles are equipped with a highway driving assist (HDA) function, a driver status warning (DSW) function, which determines driver awareness, such as drowsy driving or gaze departure (e.g., distracted driving), and other abnormal situations and outputs a warning alert through an instrument cluster or the like, a driver awareness warning (DAW) function, which determines, via a front-view mirror, whether the vehicle is exhibiting an abnormal driving behavior such as drifting out of the driving lane, a forward collision-avoidance assist (FCA) or active emergency brake system (AEBS) function for performing emergency braking when a head-on collision is detected or anticipated, or the like.

When there is a preceding vehicle (e.g., a vehicle driving in front) on an ego-lane (e.g., current driving lane), an existing autonomous driving system may set the preceding vehicle as a target and perform autonomous driving control to follow the preceding vehicle. When there is no preceding vehicle, the existing autonomous driving system may perform autonomous driving control based on the road speed limit. In this case, when the preceding vehicle is not a vehicle optimized for longitudinal autonomous driving control or otherwise exhibits driving behaviors that are not conducive to autonomous driving, the following vehicle (e.g., host vehicle) engaged in autonomous driving to follow the preceding vehicle may deactivate its autonomous driving function or its autonomous driving performance may be degraded. Thus, there is a need to develop a technology for addressing such problems.

SUMMARY

The present disclosure has been made to solve the above-mentioned problems occurring in the prior art while advantages achieved by the prior art are maintained intact.

An aspect of the present disclosure provides a longitudinal autonomous driving control apparatus for following a target vehicle and a method thereof.

Another aspect of the present disclosure provides an autonomous driving control apparatus for addressing a problem of an existing technology, in which inappropriate vehicle is set as a following target for longitudinal autonomous driving control, and a method thereof.

Another aspect of the present disclosure provides an autonomous driving control apparatus for actively selecting a target vehicle optimized for longitudinal autonomous driving control performance to improve completeness of an autonomous driving function and a method thereof.

Another aspect of the present disclosure provides an autonomous driving control apparatus for preventing an autonomous driving function from being deactivated as longitudinal autonomous driving control following a target vehicle in an autonomous driving system violates the concept of autonomous driving control to improve stability of the autonomous driving system and a method thereof.

Another aspect of the present disclosure provides an autonomous driving control apparatus for improving ride quality of an autonomous vehicle and a method thereof.

The technical problems to be solved by the present disclosure are not limited to the aforementioned problems, and any other technical problems not mentioned herein will be clearly understood from the following description by those skilled in the art to which the present disclosure pertains.

An autonomous driving control apparatus may include a sensor device provided in a vehicle to obtain information about one or more surrounding other vehicles and a controller that analyzes longitudinal behaviors of the one or more surrounding vehicles and determines whether the one or more surrounding vehicles are suitable for longitudinal following via autonomous driving control of the vehicle.

The sensor device may include at least one of a camera, a radio detection and ranging (radar), or a light detection and ranging (LiDAR).

The controller may be configured to determine whether the one or more surrounding vehicles are suitable for longitudinal following via autonomous driving control of the vehicle, based on a comparison (e.g., similarity) between a longitudinal behavior of the vehicle, according to an autonomous driving control strategy of the vehicle, and the longitudinal behaviors of the one or more surrounding vehicles.

The controller may be configured to determine whether the one or more surrounding vehicles are suitable for longitudinal following via autonomous driving control of the vehicle, based on whether longitudinal acceleration of each of the one or more surrounding vehicles is within a threshold range.

The controller may be configured to determine whether the one or more surrounding vehicles are suitable for longitudinal following autonomous driving control of the vehicle, based on whether a jerk of each of the one or more surrounding vehicles is within a threshold range.

The controller may be configured to determine whether the one or more surrounding vehicles are suitable for longitudinal following via autonomous driving control of the vehicle, based on a frequency with which a jerk of each of the one or more surrounding vehicles exceeds a threshold value.

The controller may be configured to determine whether the one or more surrounding vehicles are suitable for longitudinal following via autonomous driving control of the vehicle, based on whether a distance from a forward vehicle in front of the one or more surrounding vehicles exceeds a threshold distance.

The controller may be configured to determine whether the one or more surrounding vehicles are suitable for longitudinal following via autonomous driving control of the vehicle, based on a time duration between a first time when a forward vehicle in front of the one or more surrounding vehicles starts to decelerate and a second time when the one or more surrounding vehicles start to decelerate.

The one or more surrounding vehicles may include a preceding vehicle traveling in a lane in which the vehicle is traveling. The controller may be configured to cause the vehicle to follow the preceding vehicle to perform longitudinal following via autonomous driving control of the vehicle, based on a determination that the preceding vehicle is suitable for longitudinal following via autonomous driving control.

the vehicle may be traveling in a first lane. The one or more surrounding vehicles may include a preceding vehicle traveling in a second lane adjacent to the first lane. The controller may be configured to cause the vehicle to make a lane change to the second lane via autonomous driving control, based on a determination that the preceding vehicle is suitable for longitudinal following via autonomous driving control and may cause the vehicle to follow the preceding vehicle to perform longitudinal following via autonomous driving control of the vehicle.

The one or more surrounding vehicles may include a preceding vehicle traveling in a first lane conducive to making a lane change. The controller may be configured to cause the vehicle to move to the first lane via autonomous driving control, based on a determination that the preceding vehicle is suitable for longitudinal following via autonomous driving control. The controller may be configured to cause the vehicle to move to a second lane adjacent to the first lane, based on determining, before the preceding vehicle makes the lane change, another vehicle traveling in the second lane to be suitable for longitudinal following via autonomous driving control, and may be configured to follow the another vehicle to perform longitudinal following via autonomous driving control of the vehicle.

the one or more surrounding vehicles may include a preceding vehicle traveling in a first lane conducive to making a lane change. The controller may be configured to cause the vehicle to follow the preceding vehicle to perform longitudinal following via autonomous driving control of the vehicle, based on determining, before the preceding vehicle makes the lane change, another vehicle, traveling in a second lane adjacent to the first lane, to be unsuitable for longitudinal following via autonomous driving control.

An autonomous driving control method may include obtaining, by a sensor device provided in a vehicle, information about one or more surrounding vehicles and analyzing, by a controller, longitudinal behaviors of the one or more surrounding vehicles and determining whether the one or more surrounding vehicles are suitable for longitudinal following via autonomous driving control of the vehicle.

Determining of whether the one or more surrounding vehicles are suitable for longitudinal following via autonomous driving control of the vehicle may include determining, by the controller, whether the one or more surrounding vehicles are suitable for longitudinal following via autonomous driving control of the vehicle, based on a comparison between a longitudinal behavior of the vehicle, according to an autonomous driving control strategy of the vehicle, and the longitudinal behaviors of the one or more surrounding vehicles.

Determining of whether the one or more surrounding vehicles are suitable for longitudinal following via autonomous driving control of the vehicle by the controller may include determining, by the controller, whether the one or more surrounding vehicles are suitable for longitudinal following via autonomous driving control of the vehicle, based on whether longitudinal acceleration of each of the one or more surrounding vehicles is within a predetermined range.

Determining of whether the one or more surrounding vehicles are suitable for longitudinal following via autonomous driving control of the vehicle by the controller may include determining, by the controller, whether the one or more surrounding vehicles are suitable for longitudinal following via autonomous driving control of the vehicle, based on whether a jerk of each of the one or more surrounding vehicles is within a predetermined range.

Determining of whether the one or more surrounding vehicles are suitable for longitudinal following via autonomous driving control of the vehicle by the controller may include determining, by the controller, whether the one or more surrounding vehicles are suitable for longitudinal following via autonomous driving control of the vehicle, based on a frequency where a jerk of each of the one or more surrounding vehicles exceeds a threshold value.

Determining of whether the one or more surrounding vehicles are suitable for longitudinal following via autonomous driving control of the vehicle by the controller may include determining, by the controller, whether the one or more surrounding vehicles are suitable for longitudinal following via autonomous driving control of the vehicle, based on whether a distance from a forward vehicle in front of the one or more surrounding vehicles exceeds a threshold distance.

Determining of whether the one or more surrounding vehicles are suitable for longitudinal following via autonomous driving control of the vehicle by the controller may include determining, by the controller, whether the one or more surrounding vehicles are suitable for longitudinal following via autonomous driving control of the vehicle, based on a time duration between a first time when a forward vehicle in front of the one or more surrounding vehicles starts to decelerate and a second time when the one or more surrounding vehicles start to decelerate.

The vehicle may be traveling in a first lane. The one or more surrounding vehicles may include a preceding vehicle traveling in a second lane adjacent to the first lane. The autonomous driving control method may further include causing, by the controller, the vehicle to make a lane change to the second lane via autonomous driving, based on a determination that the preceding vehicle is suitable for longitudinal following via autonomous driving control, and causing, by the controller, the vehicle to follow the preceding vehicle to perform longitudinal following via autonomous driving control of the vehicle.

BRIEF DESCRIPTION OF THE DRAWINGS

The above and other objects, features and advantages of the present disclosure will be more apparent from the following detailed description taken in conjunction with the accompanying drawings:

FIG. 1 is a table illustrating example automation levels of an autonomous vehicle;

DETAILED DESCRIPTION

Figure 2:
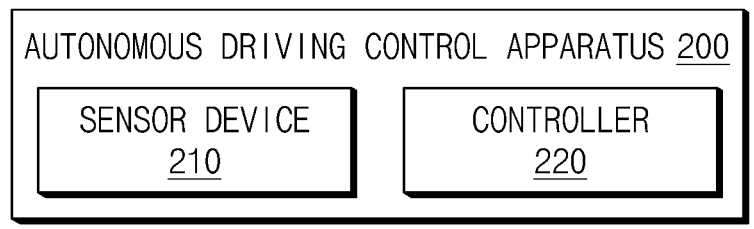
FIG. 2 is a block diagram illustrating an example autonomous driving control apparatus.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 7.

FIG. 1 is a table illustrating example automation levels of an autonomous vehicle.

An autonomous vehicle refers to a vehicle which can recognize a driving environment by itself to determine risk, control its driving route to minimize driving manipulation of a driver, and drive itself.

The autonomous vehicle may refer to a vehicle capable of performing driving, steering, and parking without human intervention and feature autonomous driving technology, which is the core foundation of the autonomous vehicle, that is, a capability to operate the vehicle without active control or monitoring of the driver.

Referring to FIG. 1, the driving environment may be monitored by the driver in automation levels 0 through 2. On the other hand, the driving environment may be monitored by the automated driving system in automation levels 3 through 5.

However, the concept of autonomous vehicles currently on the market may include an intermediate automation level to a fully autonomous vehicle and may correspond to a goal-oriented concept premised on the mass production and commercialization of fully autonomous vehicles.

An autonomous driving control method may be applicable to an autonomous vehicle corresponding to levels 3 (e.g., conditional automation) through 5 (e.g., full automation) as shown in FIG. 1, but is not necessarily limited thereto, and may be applicable to an autonomous vehicle supporting a plurality of various automation levels.

An automation level of the autonomous vehicle may be classified as shown in a table of FIG. 1 based on the Society of Automotive Engineers (SAE).

FIG. 2 is a block diagram illustrating an example autonomous driving control apparatus.

An autonomous driving control apparatus 200 may be implemented inside or outside a vehicle. In this case, the autonomous driving control apparatus 200 may be integrally configured with control units in the vehicle or may be implemented as a separate hardware device to be connected with the control units of the vehicle by a connection means.

As an example, the autonomous driving control apparatus 200 may be integrally configured with the vehicle or may be implemented as a separate configuration independent of the vehicle in the form of being installed/attached to the vehicle. Alternatively, a part of the autonomous driving control apparatus 200 may be integrally configured with the vehicle and the other may be implemented as a separate configuration independent of the vehicle in the form of being installed/attached to the vehicle.

Referring to FIG. 2, the autonomous driving control apparatus 200 may include a sensor device 210 and a controller 220.

The sensor device 210 may be provided in the vehicle to obtain the surrounding environment and collect information about one or more surrounding (e.g., nearby, adjacent, proximate, within a threshold distance, etc.) vehicles.

Particularly, the sensor device 210 may obtain information about positions and behaviors of one or more surrounding vehicles, by means of one or more sensors provided in the vehicle.

As an example, the sensor device 210 may include a camera, a radio detection and ranging (radar), and/or a light detection and ranging (LiDAR).

As an example, the sensor device 210 may be directly or indirectly connected with the controller 220 through wireless or wired communication to deliver the obtained information about the one or more surrounding vehicles to the controller 220.

As another example, the sensor device 210 may store the obtained information about the one or more surrounding vehicles in a memory, such that the controller 220 may access the information about the one or more surrounding vehicles if necessary.

The controller 220 may perform the overall control such that respective components may normally perform their own functions. Such a controller 220 may be implemented in the form of hardware, may be implemented in the form of software, or may be implemented in the form of a combination thereof. The controller 220 may be implemented as, but not limited to, a microprocessor. In addition, the controller 220 may perform data processing, calculation, and the like as described herein below.

The controller 220 may include a processor which performs data processing and/or calculation, which will be described herein. Furthermore, the controller 220 may include a memory which stores data or an algorithm required in a process of performing data processing and/or calculation.

The processor which may be included in the controller 220 may be an electric circuit which executes a command (e.g., instruction) of software. For example, the processor included in the controller 220 may be an electronic control unit (ECU), a micro controller unit (MCU), or another sub-controller.

The memory which may be included in the controller 220 may include at least one type of storage medium, such as a flash memory type memory, a hard disk type memory, a micro type memory, a card type memory (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic RAM (MRAM), a magnetic disk, or an optical disk.

The controller 220 may analyze longitudinal (e.g., in a direction coinciding with the forward or backward movement of a vehicle) behaviors of one or more surrounding vehicles and may determine whether the one or more surrounding vehicles are vehicles suitable for longitudinal following autonomous driving control (e.g., longitudinal following via autonomous driving control) of the vehicle.

An autonomous driving system may set a vehicle in front of the host vehicle as a following target vehicle. The autonomous driving control apparatus 200 may identify whether another vehicle is suitable as a target vehicle for following (e.g., chasing, trailing, tailing, tracking, maintaining a safe distance, etc.).

The controller 220 may analyze a longitudinal behavior of a forward preceding vehicle which travels in the same lane as the host vehicle and may determine whether the forward preceding vehicle is a vehicle suitable as a target for longitudinal following via autonomous driving control of the vehicle. Herein, a "preceding" vehicle may refer to a vehicle that is ahead of another vehicle either within the same driving lane or in a different (e.g., adjacent) lane.

As an example, after analyzing the longitudinal behavior of the forward preceding vehicle, when it is determined that the forward preceding vehicle is a vehicle suitable for the longitudinal following via autonomous driving control of the vehicle, the controller 220 may set the forward preceding vehicle as the target vehicle for following. The controller 220 may cause the host vehicle to follow the forward preceding vehicle and may perform the longitudinal following via autonomous driving control of the vehicle.

As an example, after analyzing the longitudinal behavior of the forward preceding vehicle, when it is determined that the forward preceding vehicle is unsuitable for longitudinal following via autonomous driving control of the vehicle, the controller 220 may analyze a longitudinal behavior of another vehicle which is traveling in another lane (e.g., different from the driving lane of the host vehicle) and may determine whether the other vehicle traveling in the other lane is suitable for the longitudinal following via autonomous driving control of the vehicle.

As an example, when it is determined that the forward preceding vehicle traveling in the same lane as the host vehicle (e.g., ego-lane) is unsuitable for longitudinal following via autonomous driving control of the vehicle, the controller 220 may analyze a longitudinal behavior of another surrounding (e.g., nearby, adjacent, proximate, within a threshold distance, etc.) vehicle, which is traveling in a lane adjacent to an ego-lane, as a next priority and may determine whether the surrounding vehicle traveling in the lane adjacent to the ego-lane is suitable for longitudinal following via autonomous driving control of the vehicle.

As an example, if it is determined that the preceding vehicle, traveling in the lane adjacent to the lane in which the host vehicle is traveling, is suitable for longitudinal following via autonomous driving control, the controller 220 may cause a lane change of the host vehicle to the adjacent lane by means of autonomous driving and may follow the preceding vehicle traveling in the adjacent lane to perform longitudinal following via autonomous driving control of the vehicle.

As an example, the controller 220 may control driving, braking, and/or steering of the host vehicle using the autonomous driving system of the vehicle to make a lane change of the vehicle.

As an example, if it is determined that the surrounding vehicle traveling in the lane adjacent to the ego-lane is unsuitable for the longitudinal following autonomous driving control of the vehicle, the controller 220 may analyze a longitudinal behavior of a surrounding vehicle traveling in a lane other than the ego-lane and the adjacent lane, and may determine whether the surrounding vehicle traveling in the lane other than the ego-lane and the adjacent lane is suitable for longitudinal following via autonomous driving control of the vehicle.

As an example, there may be a surrounding vehicle traveling in a lane that is conducive to making a lane change while driving among one or more surrounding vehicles.

The lane conducive to making a lane change may include a passing lane (e.g., an overtaking lane), in which vehicles are expected or required by road regulations to change to another lane (e.g., non-passing lane) once an overtaking action is complete rather than driving continuously in the passing lane for a long stretch of time.

The lane conducive to making a lane change may include a reversible lane, on which traffic may travel in either direction and vehicles are likely to make a lane change as a driving direction or attribute of the lane is changed over time or according to the volume of traffic.

The lane conducive to making a lane change may include an exit lane of a junction or an interchange, which is connected with another road with respect to the junction or the interchange and vehicles are likely to make a lane change upon exit and/or entrance.

Other lanes conducive to making a lane change while driving may lanes that often a lane change by virtue of road regulations and/or the shape of the route.

As an example, when it is determined that a preceding vehicle traveling in a lane conducive to making a lane change while driving is suitable for longitudinal following via autonomous driving control, the controller 220 may cause the host vehicle to make a lane change to the lane that the target vehicle is expected to transition into.

As an example, when a vehicle (e.g., target vehicle) suitable for longitudinal following via autonomous driving control is identified among other vehicles that are traveling in a lane adjacent to the lane conducive to making a lane change before the lane change is expected to occur, the controller 220 may make a lane change of the host vehicle to the adjacent lane and may follow the identified vehicle to perform longitudinal following with via autonomous driving control of the vehicle.

When longitudinal following via autonomous driving control is performed by following a target vehicle that is traveling in a lane conducive to making a lane change, in order to increase or maintain stability of autonomous driving, the controller 220 may make a lane change of the host vehicle to an adjacent lane and may follow a new target vehicle that is traveling in the adjacent lane and is suitable the longitudinal following via autonomous driving control.

As an example, if a vehicle suitable for longitudinal following via autonomous driving control is not identified among the other vehicles that are traveling in the lane adjacent to the lane conducive to making a lane change before the lane change is expected to occur, the controller 220 may follow a preceding vehicle traveling in the lane conducive to making a lane change to perform longitudinal following via autonomous driving control of the vehicle.

The controller 220 may make the lane change of the host vehicle at a time point when the lane change is expected to occur.

This is to allow identifying a better target vehicle to follow via autonomous driving control and increase the long-term stability of autonomous driving despite the potential temporary decrease in stability of autonomous driving due to the lane change.

Hereinafter, a detailed description will be given of the controller 220 determining whether the one or more surrounding vehicles are suitable for longitudinal following via autonomous driving control of the vehicle.

As an example, the controller 220 may determine whether one or more surrounding vehicles are suitable for longitudinal following via autonomous driving control of the vehicle, based on any similarity between a longitudinal behavior of the host vehicle according to an autonomous driving control strategy of the host vehicle and longitudinal behaviors of the one or more surrounding vehicles.

When following a surrounding vehicle having a high (e.g., above a threshold) similarity of a longitudinal behavior with the longitudinal behavior of the host vehicle according to the autonomous driving control strategy of the host vehicle to perform longitudinal following via autonomous driving control of the vehicle, the controller 220 may prevent an autonomous driving function from being deactivated because of violation of any conditions necessary for autonomous driving of the vehicle.

Thus, the controller 220 may determine that a surrounding vehicle has a similarity (e.g., above a specific level) of a longitudinal behavior with the longitudinal behavior of the host vehicle (e.g., according to the autonomous driving control strategy of the host vehicle), and identify that surrounding vehicle as the target vehicle suitable for longitudinal following via autonomous driving control.

The controller 220 may quantize and evaluate the similarity between the longitudinal behavior of the host vehicle (e.g., according to the autonomous driving control strategy of the host vehicle) and the longitudinal behaviors of one or more surrounding vehicles. When the quantized similarity value is greater than a predetermined threshold, the controller 220 may determine a surrounding vehicle (e.g., a surrounding vehicle with the highest similarity value) as the target vehicle for longitudinal following via autonomous driving control.

As an example, the controller 220 may determine whether one or more surrounding vehicles are suitable for longitudinal following via autonomous driving control of the vehicle, based on ride quality provided by the host vehicle when following the one or more surrounding vehicles to perform longitudinal following via autonomous driving control, which is evaluated according to longitudinal behaviors of the one or more surrounding vehicles.

As an example, the controller 220 may determine ride quality provided by the host vehicle when following the one or more surrounding vehicles to perform longitudinal following via autonomous driving control, based on longitudinal acceleration or a jerk of each of the one or more surrounding vehicles.

Herein, the jerk (e.g., jolt) may refer to a rate at which acceleration or deceleration of the vehicle changes (e.g., a derivative of acceleration or deceleration; or a second derivative of velocity or speed), which may be a criterion for evaluating ride quality.

As an example, the controller 220 may determine whether the one or more surrounding vehicles are suitable for longitudinal following via autonomous driving control of the vehicle, based on whether longitudinal acceleration or deceleration of each of the one or more surrounding vehicles is included in a predetermined range.

When the one or more surrounding vehicles accelerate or decelerate and when the longitudinal acceleration of each of the one or more one or more surrounding vehicles is greater in magnitude than a predetermined threshold, the autonomous driving system may fail to respond in a process of following the other vehicle to perform the longitudinal autonomous driving control of the vehicle or ride quality may be greatly reduced although the autonomous driving system responds to perform autonomous driving control.

Thus, the controller 220 may determine a surrounding vehicle, whose longitudinal acceleration is not greater in magnitude than the predetermined threshold, as the target vehicle suitable for longitudinal following via autonomous driving control.

As an example, the controller 220 may determine whether the one or more surrounding vehicles are suitable for longitudinal following via autonomous driving control of the vehicle, based on whether a jerk of each of the one or more surrounding vehicles is within a predetermined range.

When there is a change in acceleration of each of the one or more surrounding vehicles and when a jerk of each of the one or more one or more surrounding vehicles is greater in magnitude than the predetermined threshold, the autonomous driving system may fail to respond in a process of following the other vehicle to perform longitudinal autonomous driving control of the vehicle and/or the ride quality may be greatly reduced despite the autonomous driving system responding to perform autonomous driving control.

Thus, the controller 220 may determine (e.g., identify) a surrounding vehicle, a longitudinal jerk of which is not greater in magnitude than the predetermined threshold, as the target vehicle suitable for longitudinal following via autonomous driving control.

As an example, the controller 220 may determine whether the one or more surrounding vehicles are suitable for longitudinal following via autonomous driving control of the vehicle, based on a frequency of jerks of each of the one or more surrounding vehicles being greater in magnitude than a predetermined reference (e.g., threshold) value.

When a change in acceleration of each of the one or more surrounding vehicles frequently occurs and/or when the controller 220 causes the host vehicle to follow the other vehicle to perform longitudinal autonomous driving control of the vehicle, ride quality may be reduced.

Thus, the controller 220 may determine (e.g., identify) one or more surrounding vehicles, in which the frequency of the longitudinal jerks greater in magnitude than the predetermined reference (e.g., threshold) value is not greater than the predetermined threshold, as the target vehicle(s) suitable for longitudinal following autonomous driving control.

As an example, the controller 220 may determine whether the one or more surrounding vehicles are suitable for longitudinal following via autonomous driving control of the vehicle, based on whether a distance from a forward vehicle in front of the one or more surrounding vehicles is greater than a predetermined threshold distance.

When the distance from the forward vehicle in front of the one or more surrounding vehicles is short, because the other vehicle is able to make an abrupt stop when stopped, when the controller 220 follows the other vehicle to perform longitudinal autonomous driving control of the vehicle, a risk of the autonomous driving control may be increased.

Thus, the controller 220 may determine one or more surrounding vehicles, in which the distance from the forward vehicle is greater than the predetermined threshold distance, as the vehicles suitable for the longitudinal following autonomous driving control.

As an example, the controller 220 may determine whether the one or more surrounding vehicles are the vehicles suitable for the longitudinal following autonomous driving control of the vehicle, based on a time from a time point when a forward vehicle in front of the one or more surrounding vehicles decelerates to a time point when the one or more surrounding vehicles decelerate.

When deceleration responsiveness of each of the one or more surrounding vehicles has a difference with deceleration responsiveness according to the autonomous driving control strategy of the vehicle, the autonomous driving function may be released or performance of the autonomous driving function may be degraded, in a process of following the other vehicle to perform the longitudinal autonomous driving control of the vehicle.

Thus, the controller 220 may determine one or more surrounding vehicles, in which a difference between the time from the time point when the forward vehicle decelerates to the time point when the one or more surrounding vehicles decelerate and the deceleration response time according to the autonomous driving control strategy of the vehicle is not greater than the predetermined threshold, as the vehicles suitable for the longitudinal autonomous driving control.

Herein, the deceleration response time according to the autonomous driving control strategy of the vehicle may be determined based on a time from a time point when the forward vehicle decelerates to a time point when the autonomous driving system generates a deceleration profile.

As an example, the controller 220 may determine one or more surrounding vehicles, which meet all the conditions exemplified to determine whether the one or more surrounding vehicles are the vehicles suitable for the longitudinal following autonomous driving control, as the vehicles suitable for the longitudinal following autonomous driving control.

As another example, the controller 220 may determine one or more surrounding vehicles, which meet a specific number of conditions among the exemplified conditions, as the vehicles suitable for the longitudinal following autonomous driving control.

Figure 3:
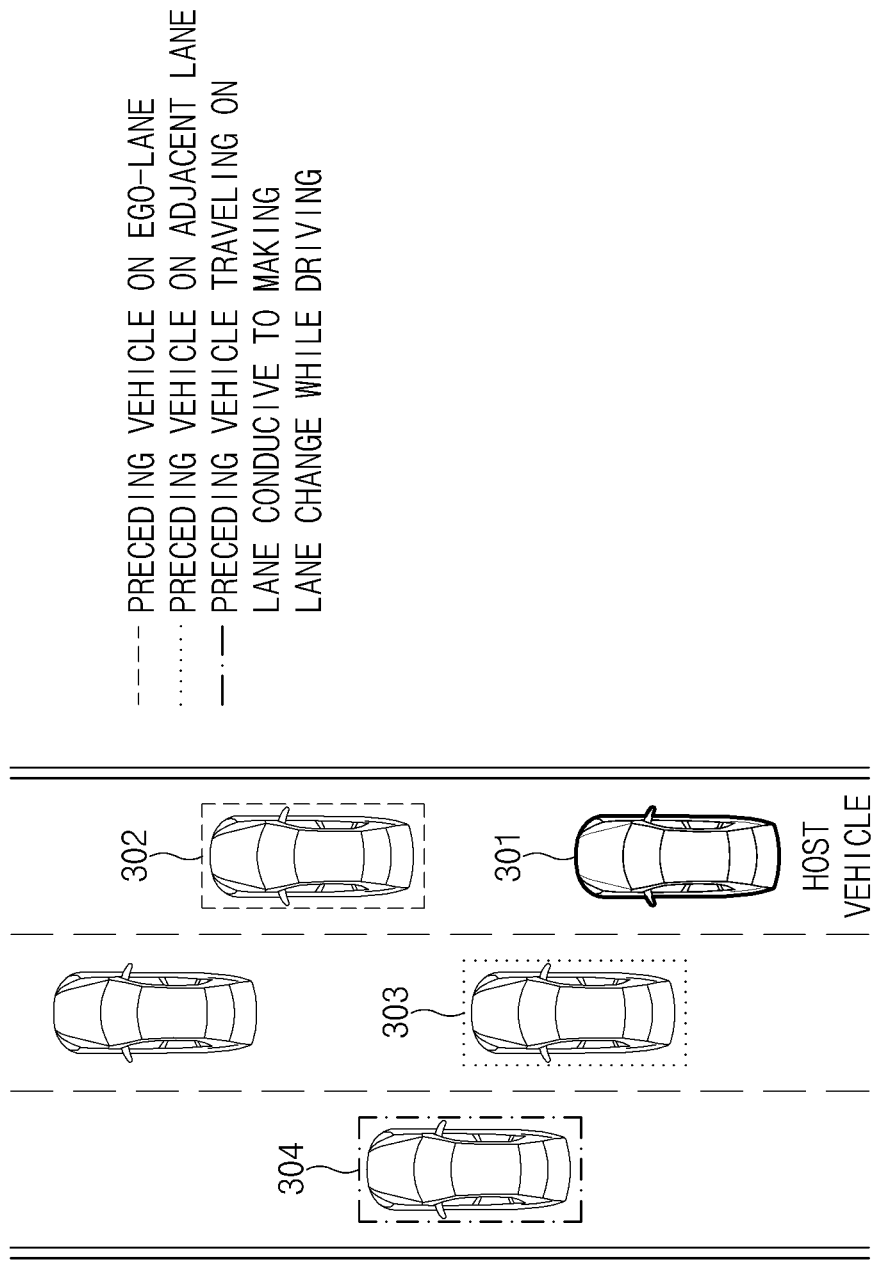
FIG. 3 is a drawing illustrating example classifications of surrounding vehicles by an autonomous driving control apparatus.

FIG. 3 is a drawing illustrating example classifications of surrounding vehicles by an autonomous driving control apparatus.

Referring to FIG. 3, an autonomous driving control apparatus provided in a host vehicle 301 may obtain information about surrounding vehicles 302, 303, and 304 around the host vehicle 301 by means of one or more sensors provided in the host vehicle 301.

The autonomous driving control apparatus may obtain information about surrounding vehicles which are traveling in another lane as well as an ego-lane in which the host vehicle 301 is traveling.

The autonomous driving control apparatus may obtain information about one or more other vehicles which are traveling in a longitudinal direction ahead of the host vehicle 301.

As an example, the autonomous driving control apparatus may first determine whether the preceding vehicle 302 traveling in the ego-lane in which the host vehicle 301 is traveling is a vehicle suitable for longitudinal following autonomous driving control of the host vehicle 301.

As an example, when it is determined that the preceding vehicle 302 traveling in the ego-lane is the vehicle suitable for the longitudinal following autonomous driving control of the host vehicle 301, the autonomous driving control apparatus may follow the preceding vehicle 302 traveling in the ego-lane to perform the longitudinal following autonomous driving control of the host vehicle 301.

As an example, when it is determined that the preceding vehicle 302 traveling in the ego-lane is the vehicle not suitable for the longitudinal following autonomous driving control of the host vehicle 301, the autonomous driving control apparatus may determine whether the preceding vehicle 303 traveling in an adjacent lane is suitable for the longitudinal following autonomous driving control of the host vehicle 301.

As an example, when it is determined that the preceding vehicle 303 traveling in the adjacent lane is suitable for the longitudinal following autonomous driving control of the host vehicle 301, the autonomous driving control apparatus may make a lane change of the host vehicle 301 to the adjacent lane and may follow the preceding vehicle 303 traveling in the adjacent lane to perform the longitudinal following autonomous driving control of the host vehicle 301.

As an example, when it is determined that the preceding vehicle 303 traveling in the adjacent lane is not suitable for the longitudinal following autonomous driving control of the host vehicle 301, the autonomous driving control apparatus may determine whether the preceding vehicle 304 traveling in a lane expected to make a lane change (e.g., a lane conducive to making a lane change) while driving is suitable for the longitudinal following autonomous driving control of the host vehicle 301.

As an example, when it is determined that the preceding vehicle 304 traveling in the lane conducive to making a lane change while driving is suitable for longitudinal following autonomous driving control of the host vehicle 301, the autonomous driving control apparatus may make a lane change of the host vehicle 301 to the lane conducive to making a lane change while driving and may follow the preceding vehicle 304 traveling in the lane conducive to making a lane change while driving to perform the longitudinal following autonomous driving control of the host vehicle 301.

As an example, when the vehicle suitable for longitudinal following autonomous driving control of the host vehicle 301 among preceding vehicles traveling in an adjacent lane is explored (e.g., analyzed, identified, etc.) before a lane change time point is reached, the autonomous driving control apparatus may make a lane change of the host vehicle 301 to the adjacent lane and may follow the vehicle suitable for the longitudinal following autonomous driving control of the host vehicle 301 traveling in the adjacent lane to perform the longitudinal following autonomous driving control of the host vehicle 301.

As an example, when the vehicle suitable of the longitudinal following autonomous driving control of the host vehicle 301 among the preceding vehicles traveling in the adjacent lane is not explored (e.g., analyzed, identified) before the lane change time point is reached, the autonomous driving control apparatus may make a lane change of the host vehicle 301 and may continue following the other vehicle the host vehicle 301 is following to perform the longitudinal following autonomous driving control of the host vehicle 301.

Figure 4:
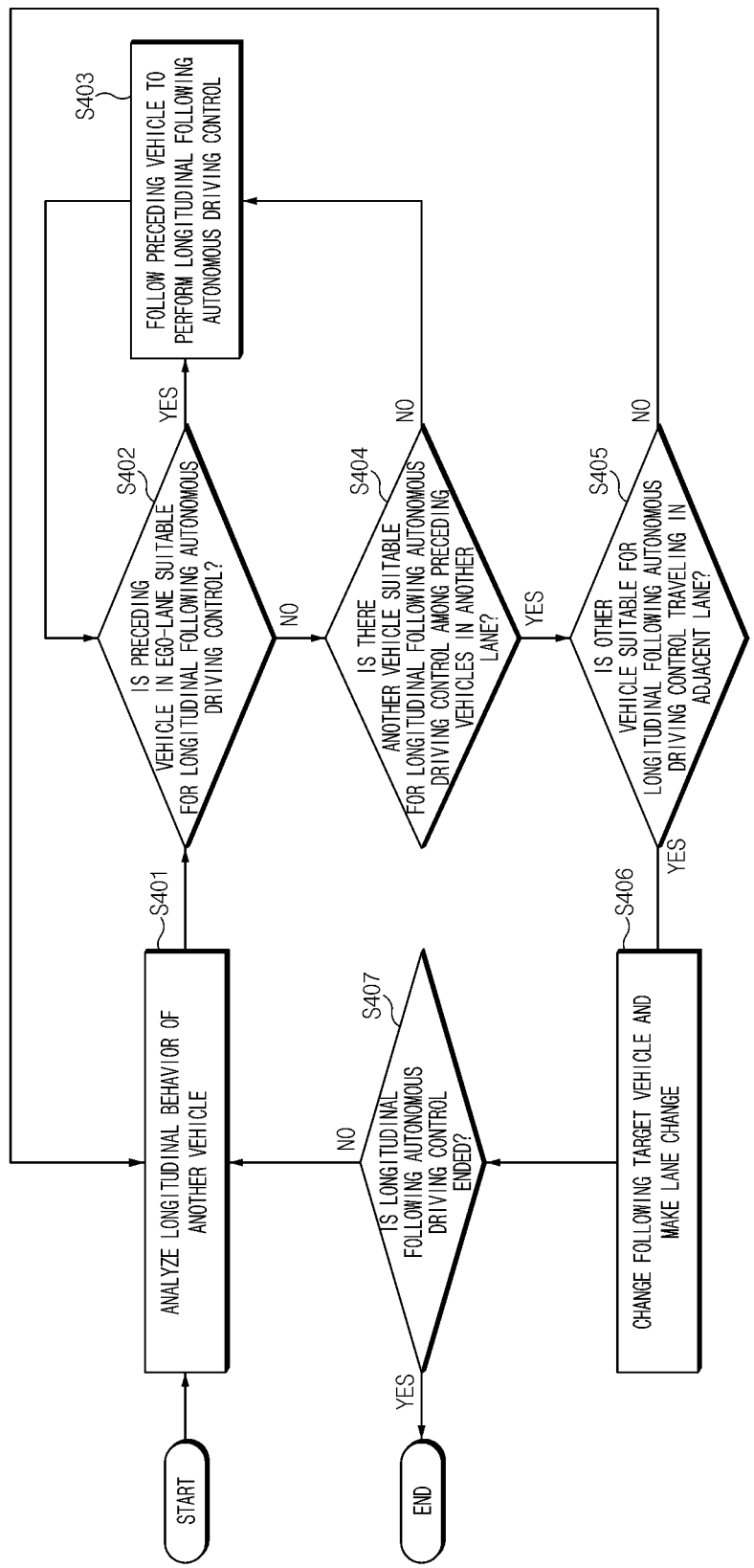
FIG. 4 is a flowchart illustrating an example method of an autonomous driving control apparatus.

FIG. 4 is a flowchart illustrating an example method of an autonomous driving control apparatus.

Hereinafter, it is assumed that an autonomous driving control apparatus 200 of FIG. 2 performs a process of FIGS. 4 and 5. Furthermore, in a description of FIGS. 4 to 5, an operation described as being performed by an autonomous driving control apparatus may be understood as being controlled by a controller 220 of the autonomous driving control apparatus 200.

Referring to FIG. 4, in S401, the autonomous driving control apparatus may analyze a longitudinal behavior of another vehicle.

As an example, when an autonomous driving initiation signal is input from a user by means of an autonomous driving activation/deactivation button or another user interface (UI) provided in a vehicle, the autonomous driving control apparatus may analyze a longitudinal behavior of another vehicle based on information obtained by means of an autonomous driving sensor provided in the vehicle.

As an example, the autonomous driving control apparatus may analyze at least one of longitudinal acceleration of another vehicle, a jerk of the other vehicle, or a distance from a forward vehicle (e.g., a preceding vehicle, a vehicle ahead, etc.).

In S402, the autonomous driving control apparatus may determine whether a preceding vehicle in an ego-lane is suitable for longitudinal following autonomous driving control.

When it is determined that the preceding vehicle in the ego-lane is suitable for the longitudinal following autonomous driving control, in S403, the autonomous driving control apparatus may follow the preceding vehicle in the ego-lane to perform the longitudinal following autonomous driving control.

As an example, the autonomous driving control apparatus may perform longitudinal following autonomous driving control for simulating the preceding vehicle in the ego-lane.

The autonomous driving control apparatus may follow the preceding vehicle in the ego-lane to perform the longitudinal following autonomous driving control and may return to S402 to determine whether the preceding vehicle in the ego-lane is suitable for the longitudinal following autonomous driving control.

When it is determined that the preceding vehicle in the ego-lane is not suitable for the longitudinal following autonomous driving control, in S404, the autonomous driving control apparatus may determine whether there is another vehicle suitable for the longitudinal following autonomous driving control among preceding vehicles in another lane.

When there is no other vehicle suitable for the longitudinal following autonomous driving control among the preceding vehicles in the other lane, in S403, the autonomous driving control apparatus may follow the preceding vehicle in the ego-lane to perform the longitudinal following autonomous driving control.

When there is another vehicle suitable for the longitudinal following autonomous driving control among the preceding vehicles in the other lane, in S405, the autonomous driving control apparatus may determine whether the other vehicle suitable for the longitudinal following autonomous driving control is traveling in a lane adjacent to the ego-lane.

As an example, the autonomous driving control apparatus may combine (e.g., fuse, merge, juxtapose, etc.) high definition map information, which may have been previously stored in a memory of the vehicle or is received from a server through a separate communication module, with autonomous driving sensor information to determine whether the other vehicle is traveling in the lane adjacent to the ego-lane.

When the other vehicle suitable for the longitudinal following autonomous driving control is not traveling in the lane adjacent to the ego-lane, the autonomous driving control apparatus may return to S402 to determine whether the preceding vehicle in the ego-lane is suitable for the longitudinal following autonomous driving control.

When the other vehicle suitable for the longitudinal following autonomous driving control is traveling in the lane adjacent to the ego-lane, in S406, the autonomous driving control apparatus may change a following target vehicle to the other vehicle suitable for the longitudinal following autonomous driving control, which is traveling in the lane adjacent to the ego-lane, and may make a lane change to the lane adjacent to the ego-lane.

As an example, the autonomous driving control apparatus may perform longitudinal following autonomous driving control for simulating the following target vehicle.

In S407, the autonomous driving control apparatus may determine whether the longitudinal following autonomous driving control is ended.

As an example, the autonomous driving control apparatus may identify whether the signal for ending the longitudinal following autonomous driving control is input from a user through an autonomous driving activation/deactivation button or another UI provided in the vehicle to determine whether the longitudinal following autonomous driving control is ended.

When the longitudinal following autonomous driving control is not ended, the autonomous driving control apparatus may return to S401 to analyze a longitudinal behavior of the other vehicle.

Figure 5:
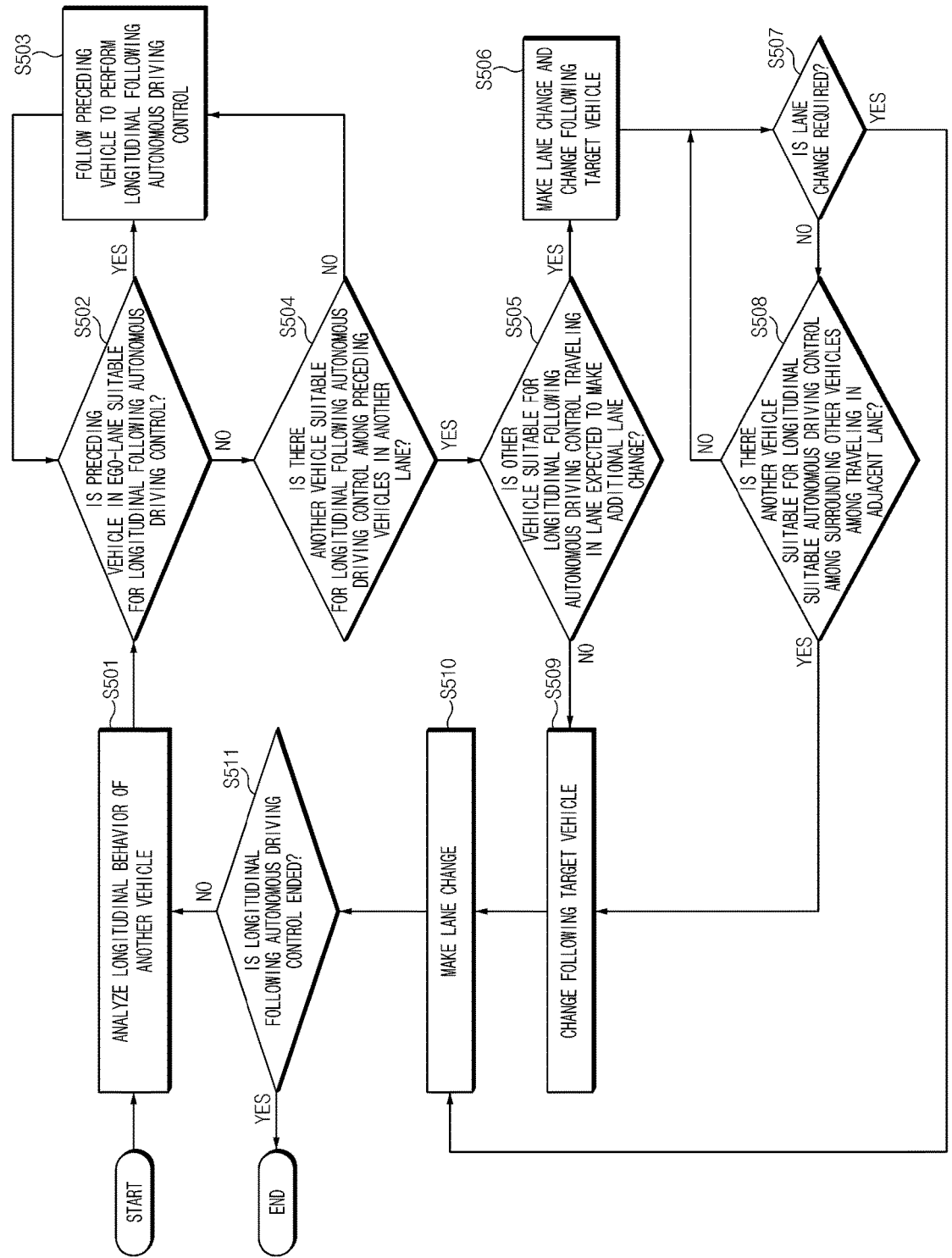
FIG. 5 is a flowchart illustrating an example method of an autonomous driving control apparatus.

FIG. 5 is a flowchart illustrating an example method of an autonomous driving control apparatus.

Referring to FIG. 5, in S501, the autonomous driving control apparatus may analyze a longitudinal behavior of another vehicle.

In S502, the autonomous driving control apparatus may determine whether a preceding vehicle in an ego-lane is suitable for longitudinal following autonomous driving control.

When it is determined that the preceding vehicle in the ego-lane is suitable for the longitudinal following autonomous driving control, in S503, the autonomous driving control apparatus may follow the preceding vehicle in the ego-lane to perform the longitudinal following autonomous driving control.

The autonomous driving control apparatus may follow the preceding vehicle in the ego-lane to perform the longitudinal following autonomous driving control and may return to S502 to determine whether the preceding vehicle in the ego-lane is suitable for the longitudinal following autonomous driving control.

When it is not determined that the preceding vehicle in the ego-lane is suitable for the longitudinal following autonomous driving control, in S504, the autonomous driving control apparatus may determine whether there is another vehicle suitable for the longitudinal following autonomous driving control among preceding vehicles in another lane.

When there is no other vehicle suitable for the longitudinal following autonomous driving control among the preceding vehicles in the other lane, in S503, the autonomous driving control apparatus may follow the preceding vehicle in the ego-lane to perform the longitudinal following autonomous driving control.

Because the process in S501 to S504 is the same as a process in S401 to S404 of FIG. 4, a detailed description thereof will be omitted.

When there is the other vehicle suitable for the longitudinal following autonomous driving control among the preceding vehicles in the other lane, in S505, the autonomous driving control apparatus may determine whether the other vehicle suitable for the longitudinal following autonomous driving control is traveling in a lane expected to make a lane change while driving.

As an example, the autonomous driving control apparatus may fuse high definition map information, which is previously stored in a memory of the vehicle or is received from a server through a separate communication module, with autonomous driving sensor information to determine whether the other vehicle is traveling in the lane conducive to making a lane change while driving.

When the other vehicle is traveling in the lane conducive to making a lane change while driving, in S506, the autonomous driving control apparatus may make a lane change to the lane conducive to making a lane change while driving and may change a following target vehicle to the other vehicle suitable for the longitudinal following autonomous driving control.

As an example, the autonomous driving control apparatus may perform longitudinal following autonomous driving control for simulating the following target vehicle.

In S507, the autonomous driving control apparatus may identify whether the lane change is required.

In detail, when the vehicle overtakes another vehicle in a passing lane, when a current time is not a driving time in a reversible lane, or when the vehicle exits or enters a junction/interchange in a junction/interchange exit lane, the autonomous driving control apparatus may determine that the lane change is required.

When the lane change is not required, in S508, the autonomous driving control apparatus may identify whether there is another vehicle suitable for longitudinal following autonomous driving control among surrounding vehicles which are traveling in an adjacent lane.

When there is the other vehicle suitable for the longitudinal following autonomous driving control among the surrounding vehicles which are traveling in the adjacent lane, in S509, the autonomous driving control apparatus may change a following target vehicle to the other vehicle suitable for the longitudinal following autonomous driving control.

As an example, the autonomous driving control apparatus may perform longitudinal following autonomous driving control for simulating the changed following target vehicle.

When there is no other vehicle suitable for the longitudinal following autonomous driving control among the surrounding vehicles which are traveling in the adjacent lane, the autonomous driving control apparatus may return to S507 to identify whether the lane change is required.

When the lane change is required, in S510, the autonomous driving control apparatus may make the required lane change.

When the other vehicle is not traveling in the lane conducive to making a lane change while driving, in S509, the autonomous driving control apparatus may change the following target vehicle to the other vehicle suitable for the longitudinal following autonomous driving control.

After changing the following target vehicle to the other vehicle suitable for the longitudinal following autonomous driving control in S509, in S510, the autonomous driving control apparatus may make a lane change to the lane in which the other vehicle suitable for the longitudinal following autonomous driving control is traveling.

In S511, the autonomous driving control apparatus may determine whether the longitudinal following autonomous driving control is ended.

When the longitudinal following autonomous driving control is not ended, the autonomous driving control apparatus may return to S501 to analyze a longitudinal behavior of the other vehicle.

Figure 6:
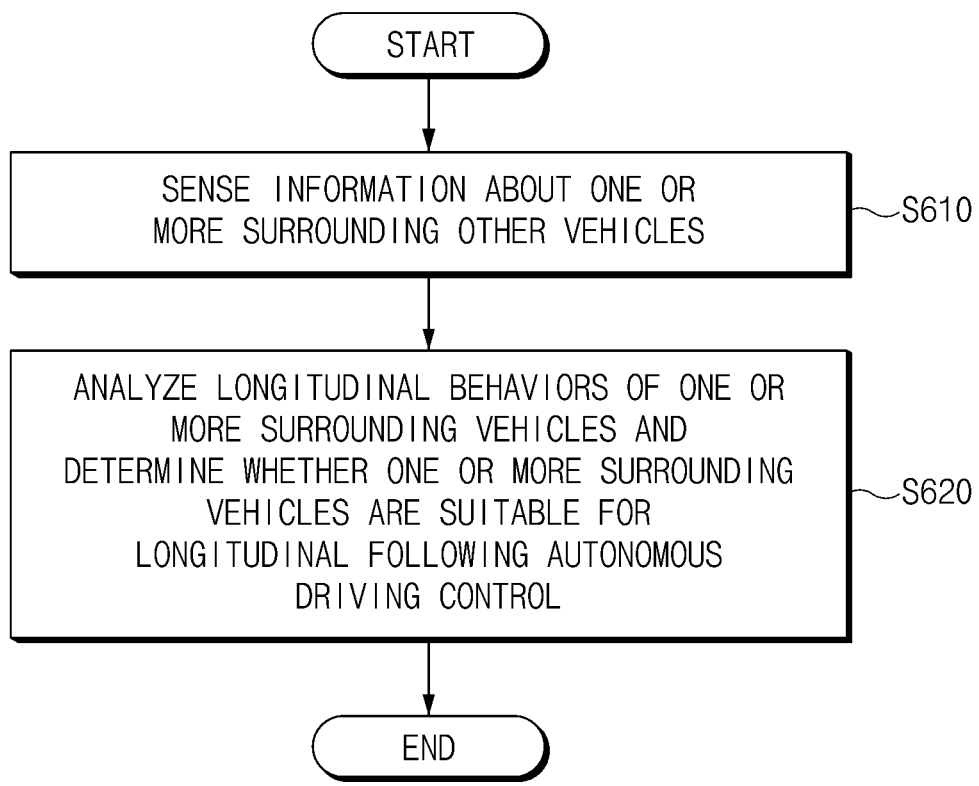
FIG. 6 is a flowchart illustrating an example autonomous driving control method.

FIG. 6 is a flowchart illustrating an example autonomous driving control method.

Referring to FIG. 6, the autonomous driving control method may include sensing (S610) information about one or more surrounding vehicles and analyzing (S620) longitudinal behaviors of the one or more surrounding vehicles and determining whether the one or more surrounding vehicles are vehicles suitable for longitudinal following autonomous driving control of a vehicle.

The sensing (S610) of the information about the one or more surrounding vehicles may be performed by a sensor device provided in the vehicle.

The analyzing (S620) of the longitudinal behaviors of the one or more surrounding vehicles and the determining of whether the one or more surrounding vehicles are the vehicles suitable for longitudinal following autonomous driving control of the vehicle may be performed by a controller.

As an example, the determining (S620) of whether the one or more surrounding vehicles are the vehicles suitable for the longitudinal following autonomous driving control of the vehicle may include determining, by the controller, whether the one or more surrounding vehicles are the vehicles suitable for the longitudinal following autonomous driving control of the vehicle, based on a similarity between a longitudinal behavior of the vehicle according to an autonomous driving control strategy of the vehicle and the longitudinal behaviors of the one or more surrounding vehicles.

As an example, the determining (S620) of whether the one or more surrounding vehicles are the vehicles suitable for the longitudinal following autonomous driving control of the vehicle may include determining, by the controller, whether the one or more surrounding vehicles are the vehicles suitable for the longitudinal following autonomous driving control of the vehicle, based on whether longitudinal acceleration of each of the one or more surrounding vehicles is included in a predetermined range.

As an example, the determining (S620) of whether the one or more surrounding vehicles are the vehicles suitable for the longitudinal following autonomous driving control of the vehicle may include determining, by the controller, whether the one or more surrounding vehicles are the vehicles suitable for the longitudinal following autonomous driving control of the vehicle, based on whether a jerk of each of the one or more surrounding vehicles is included in a predetermined range.

As an example, the determining (S620) of whether the one or more surrounding vehicles are the vehicles suitable for the longitudinal following autonomous driving control of the vehicle may include determining, by the controller, whether the one or more surrounding vehicles are the vehicles suitable for the longitudinal following autonomous driving control of the vehicle, based on a frequency where a jerk of each of the one or more surrounding vehicles is greater in magnitude than a predetermined reference value.

As an example, the determining (S620) of whether the one or more surrounding vehicles are the vehicles suitable for the longitudinal following autonomous driving control of the vehicle may include determining, by the controller, whether the one or more surrounding vehicles are the vehicles suitable for the longitudinal following autonomous driving control of the vehicle, based on whether a distance from a forward vehicle in front of the one or more surrounding vehicles is greater than a predetermined threshold distance.

As an example, the determining (S620) of whether the one or more surrounding vehicles are the vehicles suitable for the longitudinal following autonomous driving control of the vehicle may include determining, by the controller, whether the one or more surrounding vehicles are the vehicles suitable for the longitudinal following autonomous driving control of the vehicle, based on a time from a time point when the forward vehicle in front of the one or more surrounding vehicles decelerates from a time point when the one or more surrounding vehicles decelerate.

As an example, the autonomous driving control method may further include following, by the controller, a preceding vehicle traveling in a lane in which the vehicle is traveling to perform the longitudinal following autonomous driving control of the vehicle, when it is determined that the preceding vehicle traveling in the lane in which the vehicle is traveling is determined as the vehicle suitable for the longitudinal following autonomous driving control.

As an example, the autonomous driving control method may further include making, by the controller, a lane change of the vehicle to a lane adjacent to a lane in which the vehicle is traveling by means of autonomous driving, when it is determined that a preceding vehicle traveling in the lane adjacent to the lane in which the vehicle is traveling among the one or more surrounding vehicles is the vehicle suitable for the longitudinal following autonomous driving control, and following by the controller, the preceding vehicle to perform the longitudinal following autonomous driving control of the vehicle.

As an example, the autonomous driving control method may further include making, by the controller, a lane change of the vehicle to a lane expected to make a lane change while driving by means of autonomous driving, when it is determined that a preceding vehicle traveling in the lane conducive to making a lane change while driving is the vehicle suitable for the longitudinal following autonomous driving control, making, by the controller, a lane change of the vehicle to a lane adjacent to the lane conducive to making a lane change while driving, when the vehicle suitable for the longitudinal following autonomous driving control is explored among other vehicles which are traveling in the lane adjacent to the lane conducive to making a lane change while driving before a time point when the lane change is required, and following, by the controller, the explored other vehicle to perform the longitudinal following autonomous driving control of the vehicle.

As an example, the autonomous driving control method may further include following, by the controller, the preceding vehicle to perform the longitudinal following autonomous driving control of the vehicle, when the vehicle suitable for the longitudinal following autonomous driving control is not explored among the other vehicles which are traveling in the lane adjacent to the lane conducive to making a lane change while driving before the time point when the lane change is required.

Figure 7:
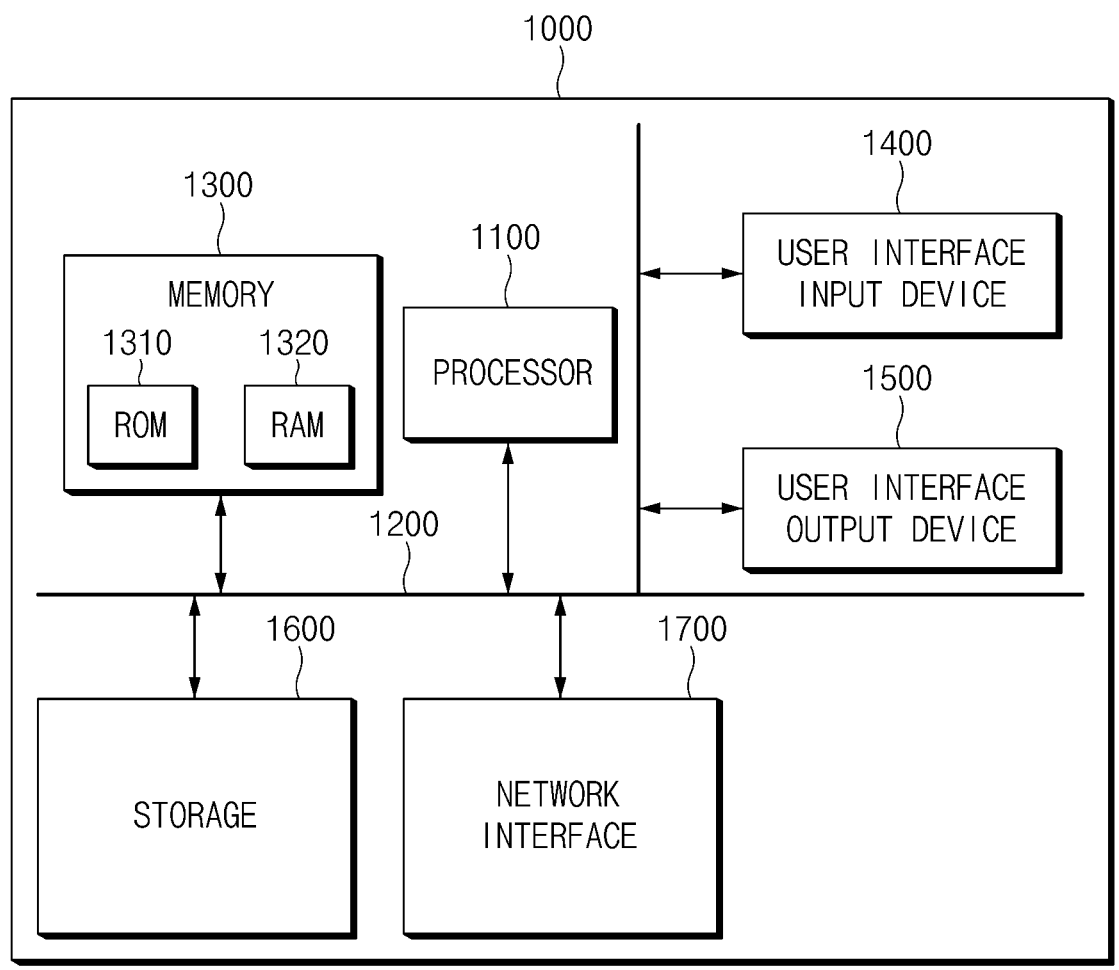
FIG. 7 is a block diagram illustrating an example computing system.

FIG. 7 is a block diagram illustrating an example computing system.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the autonomous driving control apparatus and the method thereof according to an embodiment of the present disclosure.

According to at least one of embodiments of the present disclosure, the longitudinal autonomous driving control apparatus the method thereof may be provided to follow a target vehicle.

Furthermore, according to at least one of embodiments of the present disclosure, the autonomous driving control apparatus and the method thereof may be provided to address a problem of an existing technology, in which inappropriate another vehicle is set to a following target for longitudinal autonomous driving control.

Furthermore, according to at least one of embodiments of the present disclosure, the autonomous driving control apparatus and the method thereof may be provided to actively select a target vehicle optimized for longitudinal autonomous driving control performance to improve completeness of an autonomous driving function.

Furthermore, according to at least one of embodiments of the present disclosure, the autonomous driving control apparatus and the method thereof may be provided to prevent an autonomous driving function from being released as longitudinal autonomous driving control following a target vehicle in an autonomous driving system violates the concept of autonomous driving control to improve stability of the autonomous driving system.

Furthermore, according to at least one of embodiments of the present disclosure, the autonomous driving control apparatus and the method thereof may be provided to improve ride quality of an autonomous vehicle.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An apparatus of a vehicle, the apparatus comprising:
a sensor device provided in a vehicle and configured to obtain information about one or more vehicles;
a memory storing program instructions; and
a processor configured to execute the program instructions, wherein the program instructions, when executed, are configured to cause the apparatus to:
detect, via the sensor device and based on the information about the one or more vehicles, longitudinal behaviors of the one or more vehicles;
quantize a similarity value indicating quantized similarity between a longitudinal behavior of the vehicle and the longitudinal behavior of a candidate vehicle of the one or more vehicles;
based on a determination that the quantized similarity value satisfies a threshold, select the candidate vehicle as a target vehicle for longitudinal following; and
based on a determination that the target vehicle is traveling in a lane in which the vehicle is traveling, control an autonomous driving control apparatus of the vehicle to cause the vehicle to follow the target vehicle via autonomous longitudinal following control of the vehicle.

2. The apparatus of claim 1, wherein the sensor device includes at least one of a camera, a radar, or a lidar.

3. The apparatus of claim 1, wherein the processor is configured to control the autonomous driving control apparatus of the vehicle to cause the vehicle to follow the target vehicle by controlling an autonomous driving operation of the vehicle for longitudinal following according to an autonomous driving control strategy of the vehicle.

4. The apparatus of claim 1, wherein the processor is configured to select the candidate vehicle as the target vehicle based on whether longitudinal acceleration of each of the one or more vehicles is within a predetermined range.

5. The apparatus of claim 1, wherein the processor is configured to select the candidate vehicle as the target vehicle based on whether a jerk of each of the one or more vehicles is within a predetermined range.

6. The apparatus of claim 1, wherein the processor is configured to select the candidate vehicle as the target vehicle based on a frequency with which a jerk of each of the one or more vehicles exceeds a threshold value.

7. The apparatus of claim 1, wherein the processor is configured to select the candidate vehicle as the target vehicle based on whether a distance from a forward vehicle in front of the one or more vehicles exceeds a threshold distance.

8. The apparatus of claim 1, wherein the processor is configured to select the candidate vehicle as the target vehicle based on a time duration between a first time when a forward vehicle in front of the one or more vehicles starts to decelerate and a second time when the one or more vehicles start to decelerate.

9. The apparatus of claim 1, wherein the processor is configured to:
generate, based on tracked longitudinal acceleration changes of the one or more vehicles detected via the sensor device,
quantized values indicating the longitudinal behaviors of the one or more vehicles, and quantize the similarity value based on one or more quantized values indicating the longitudinal behavior of the candidate vehicle of the one or more vehicles.

10. The apparatus of claim 1, wherein the processor is configured to:
based on the longitudinal behaviors of the one or more vehicles, identify, among the one or more vehicles, a plurality of candidate vehicles for longitudinal following; and
select the candidate vehicle by selecting, among the plurality of candidate vehicles, the candidate vehicle as the target vehicle for longitudinal following, wherein the candidate vehicle is set as an autonomous longitudinal following target.

11. A method performed by an apparatus of a vehicle, the method comprising:
obtaining, via a sensor device provided in the vehicle, information about one or more vehicles;
based on the information about the one or more vehicles, determining, by a processor of the apparatus, longitudinal behaviors of the one or more vehicles;
quantizing, by the processor, a similarity value indicating quantized similarity between a longitudinal behavior of the vehicle and the longitudinal behavior of a candidate vehicle of the one or more vehicles;
based on a determination that the quantized similarity value satisfies a threshold, selecting, by the processor, the candidate vehicle as a target vehicle for longitudinal following; and
based on a determination that the target vehicle is traveling in a lane in which the vehicle is traveling, controlling, by the processor, an autonomous driving control apparatus of the vehicle to cause the vehicle to follow the target vehicle via autonomous longitudinal following control of the vehicle.

12. The method of claim 11, wherein the controlling the autonomous driving control apparatus of the vehicle to cause the vehicle to follow the target vehicle via autonomous driving control of the vehicle comprises:
controlling, by the processor, the autonomous driving control apparatus of the vehicle to control an autonomous driving operation of the vehicle for longitudinal following according to an autonomous driving control strategy of the vehicle.

13. The method of claim 11, wherein the selecting the candidate vehicle as the target vehicle comprises:
selecting the candidate vehicle as the target vehicle based on whether longitudinal acceleration of each of the one or more vehicles is within a predetermined range.

14. The method of claim 11, wherein the selecting the candidate vehicle as the target vehicle comprises:
selecting the candidate vehicle as the target vehicle based on whether a jerk of each of the one or more vehicles is within a predetermined range.

15. The method of claim 11, wherein the selecting the candidate vehicle as the target vehicle comprises:
selecting the candidate vehicle as the target vehicle based on a frequency with which a jerk of each of the one or more vehicles exceeds a threshold value.

16. The method of claim 11, wherein the selecting the candidate vehicle as the target vehicle comprises:

selecting the candidate vehicle as the target vehicle based on whether a distance from a forward vehicle in front of the one or more vehicles exceeds a threshold distance.

17. The method of claim 11, wherein the selecting the candidate vehicle as the target vehicle comprises:
  selecting the candidate vehicle as the target vehicle based on a time duration between a first time when a forward vehicle in front of the one or more vehicles starts to decelerate and a second time when the one or more vehicles start to decelerate.

\* \* \* \* \*